United States Patent
Zhang et al.

(10) Patent No.: US 11,614,999 B2
(45) Date of Patent: Mar. 28, 2023

(54) EFFICIENT METHOD TO INDEX SCHEDULED BACKUP OF SAME TARGET AND THE CORRESPONDING FILES

(71) Applicant: EMC IP Holding Company LLC, Hopkinton, MA (US)

(72) Inventors: Ming Zhang, Shanghai (CN); Lihui Su, Shanghai (CN); James Morton, Adamstown, MD (US); Min Liu, Shanghai (CN); Weiyang Liu, Shanghai (CN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 903 days.

(21) Appl. No.: 16/396,512

(22) Filed: Apr. 26, 2019

(65) Prior Publication Data

US 2020/0341853 A1    Oct. 29, 2020

(51) Int. Cl.
   *G06F 11/14*    (2006.01)
   *G06F 16/16*    (2019.01)
   *G06F 16/13*    (2019.01)

(52) U.S. Cl.
   CPC .......... *G06F 11/1451* (2013.01); *G06F 16/13* (2019.01); *G06F 16/162* (2019.01); *G06F 2201/805* (2013.01)

(58) Field of Classification Search
   CPC .... G06F 11/1451; G06F 16/162; G06F 16/13; G06F 2201/805
   See application file for complete search history.

(56) References Cited

U.S. PATENT DOCUMENTS

| | | | | |
|---|---|---|---|---|
| 7,225,208 | B2* | 5/2007 | Midgley | G06F 11/1451 |
| 8,996,566 | B2* | 3/2015 | Haustein | G06F 16/2308 |
| | | | | 707/769 |
| 9,158,804 | B1* | 10/2015 | Rangapuram | G06F 11/1451 |
| 2015/0121132 | A1* | 4/2015 | Tian | G06F 11/1612 |
| | | | | 714/6.24 |
| 2015/0370643 | A1* | 12/2015 | Rueger | G06F 16/182 |
| | | | | 707/652 |
| 2016/0162364 | A1* | 6/2016 | Mutha | G06F 11/3476 |
| | | | | 707/645 |
| 2016/0162374 | A1* | 6/2016 | Mutha | G06F 3/0629 |
| | | | | 714/19 |
| 2016/0170836 | A1* | 6/2016 | Shrestha | G06F 11/1451 |
| | | | | 707/654 |
| 2017/0212915 | A1* | 7/2017 | Borate | G06F 11/1453 |
| 2017/0371547 | A1* | 12/2017 | Fruchtman | G06F 11/1458 |
| 2018/0032405 | A1* | 2/2018 | Chen | G06F 11/1451 |

(Continued)

*Primary Examiner* — Huawen A Peng
(74) *Attorney, Agent, or Firm* — Womble Bond Dickinson (US) LLP

(57) ABSTRACT

An apparatus, method, and system for indexing backed up files is disclosed. The operations comprise: maintaining a File index and a Backup index, the File index comprising entries each associated with an individual file backed up, the Backup index comprising entries each associated with a particular backup; receiving a request to determine whether or not a first file is included in a first backup; determining whether or not the first file is included in the first backup based on the File index entry corresponding to the first file and the Backup index entry corresponding to the first backup; and returning a result of the determination of whether or not the first file is included in the first backup.

21 Claims, 8 Drawing Sheets

(56) References Cited

U.S. PATENT DOCUMENTS

2018/0067813 A1* 3/2018 Venkatesh ........... G06F 11/1469
2018/0143767 A1* 5/2018 Sugimoto ............... G06F 3/065
2018/0329783 A1* 11/2018 Karame ............. G06F 11/0709
2020/0233845 A1* 7/2020 Dornemann ........ G06F 9/45558

* cited by examiner

Backup Index 220

| ID | Create | Expire | File ID |
|---|---|---|---|
| 1 | 10/4/2017 | 11/4/2017 | 1,2,3,4,5,6 |
| 2 | 10/5/2017 | 11/5/2017 | 1,4,5,6,7,8,9 |

200A

File Index 210

| ID | Name | Path | Other fields |
|---|---|---|---|
| 1 | File1.txt | C:/test | |
| 2 | File2.txt | C:/test | |
| 3 | File3.txt | C:/test | |
| 4 | File4.txt | C:/test | |
| 5 | File5.txt | C:/test | |
| 6 | File6.txt | C:/test | |
| 7 | File7.txt | C:/test | |
| 8 | File8.txt | C:/test | |
| 9 | File9.txt | C:/test | |

FIG. 2A
(Prior Art)

Backup Index 220

| ID | Create | Expire | File ID |
|---|---|---|---|
| 1 | 10/4/2017 | 11/4/2017 | 1,2,3,4,5,6 |
| 2 | 10/5/2017 | 11/5/2017 | 1,4,5,6,7,8,9 |

File Index 210

| ID | Name | Path | Other fields |
|---|---|---|---|
| 1 | File1.txt | C:/test | |
| 2 | File2.txt | C:/test | |
| 3 | File3.txt | C:/test | |
| 4 | File4.txt | C:/test | |
| 5 | File5.txt | C:/test | |
| 6 | File6.txt | C:/test | |
| 7 | File7.txt | C:/test | |
| 8 | File8.txt | C:/test | |
| 9 | File9.txt | C:/test | |

File Index 310

| ID | Name | Path | FirstValid | LastValid |
|----|-----------|--------|-----------|-----------|
| 1 | File1.txt | C:/test | 10/4/2017 | NULL |
| 2 | File2.txt | C:/test | 10/4/2017 | 10/5/2017 |
| 3 | File3.txt | C:/test | 10/4/2017 | 10/5/2017 |
| 4 | File4.txt | C:/test | 10/4/2017 | NULL |
| 5 | File5.txt | C:/test | 10/4/2017 | NULL |
| 6 | File6.txt | C:/test | 10/4/2017 | NULL |
| 7 | File7.txt | C:/test | 10/5/2017 | NULL |
| 8 | File8.txt | C:/test | 10/5/2017 | NULL |
| 9 | File9.txt | C:/test | 10/5/2017 | NULL |

Backup Index 320

| ID | Create | Expire |
|----|-----------|-----------|
| 1 | 10/4/2017 | 11/4/2017 |
| 2 | 10/5/2017 | 11/5/2017 |

Backup Index 320

| ID | Create | Expire |
|---|---|---|
| 1 | 10/4/2017 | 11/4/2017 |
| 2 | 10/5/2017 | 11/5/2017 |

File Index 310

| ID | Name | Path | FirstValid | LastValid |
|---|---|---|---|---|
| 1 | File1.txt | C:/test | 10/4/2017 | NULL |
| 2 | File2.txt | C:/test | 10/4/2017 | 10/5/2017 |
| 3 | File3.txt | C:/test | 10/4/2017 | 10/5/2017 |
| 4 | File4.txt | C:/test | 10/4/2017 | NULL |
| 5 | File5.txt | C:/test | 10/4/2017 | NULL |
| 6 | File6.txt | C:/test | 10/4/2017 | NULL |
| 7 | File7.txt | C:/test | 10/4/2017 | NULL |
| 8 | File8.txt | C:/test | 10/5/2017 | NULL |
| 9 | File9.txt | C:/test | 10/5/2017 | NULL |

FIG. 3B

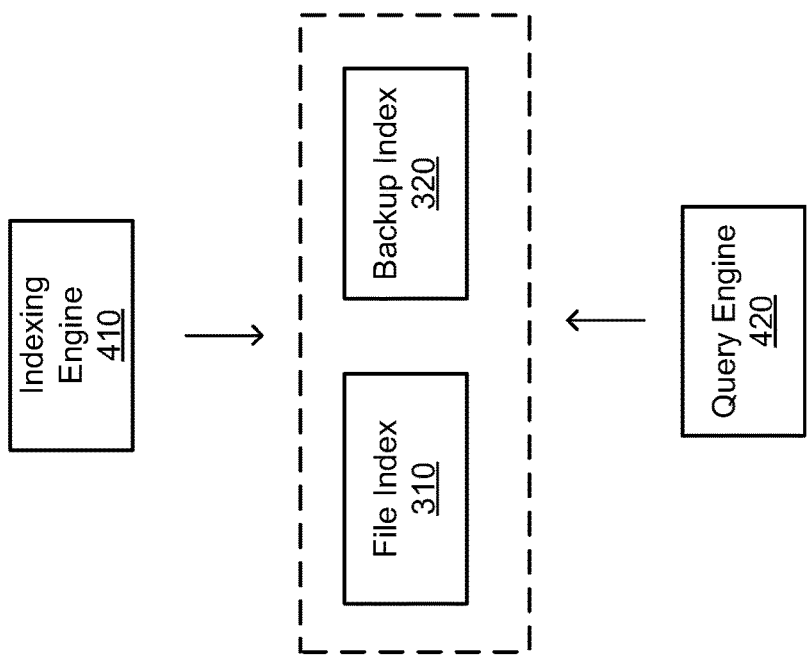

EFFICIENT METHOD TO INDEX
SCHEDULED BACKUP OF SAME TARGET
AND THE CORRESPONDING FILES

FIELD OF THE INVENTION

Embodiments of the present invention relate generally to data storage systems. More particularly, embodiments of the invention relate to indexing backed up files.

BACKGROUND

In a typical data protection scenario, backups are scheduled for the same target. Examples of such backups may include: 1) Backing up the same folder set according to scheduled policies that run daily, 2) Backing up a Network Data Management Protocol (NDMP) device according to scheduled policies that run weekly, or 3) Backing up operating system (OS) system files from a virtual machine (VM) running on a virtualization platform, either locally or in a cloud (e.g., VMWare or VMWare Cloud hosted on Amazon Web Services "AWS"), daily. All files of these scheduled backups need to be indexed, so that they are available for search.

There are challenges associated with indexing backed up files. Backups can be very large. For example, if a customer wants to back up a whole NDMP device, one backup could contain as many as 500 million files. As backups are typically generated daily, all files in each of these large backups need to be indexed. It can be inefficient to index all files of all backups, as such indexing requires too many system resources, and there can be a large number of duplicates. Therefore, the general solution involves indexing only unique files and providing an effective way to map files to backups.

An existing indexing solution uses two indexes: one File index, and one Backup index. The File index stores file metadata. Only metadata associated with unique files are stored in the File index. In other words, the File index does not contain duplicate entries for duplicate files. The Backup index stores backup metadata for backups, such as the backup creation time, the backup expiration time, and identifiers for all files belonging to a particular backup.

With the existing solution, a garbage collection thread monitors file records that do not belong in any valid backups (e.g., backups that have not expired), and delete the corresponding files.

The existing solution is associated with a few drawbacks. For example, performance can be poor when expired files are deleted during the garbage collection process. In particular, to determine whether a file is or is not referenced by any valid backup, all file identifiers associated with all valid backups need to be traversed, which is time-consuming. Further, the Backup index may consume a significant amount of storage space. Moreover, cross-referencing search results with particular backups can be slow because the search results need to be reprocessed to find the files that belong in the specified backups.

BRIEF DESCRIPTION OF THE DRAWINGS

Embodiments of the invention are illustrated by way of example and not limitation in the figures of the accompanying drawings in which like references indicate similar elements.

FIGS. 2A and 2B are diagrams illustrating an example prior art backup file indexing method.

FIGS. 3A and 3B are diagrams illustrating an example backup file indexing method according to one embodiment.

FIG. 4 is a block diagram illustrating various components that can be used with embodiments of the disclosure.

DETAILED DESCRIPTION

Figure 1:
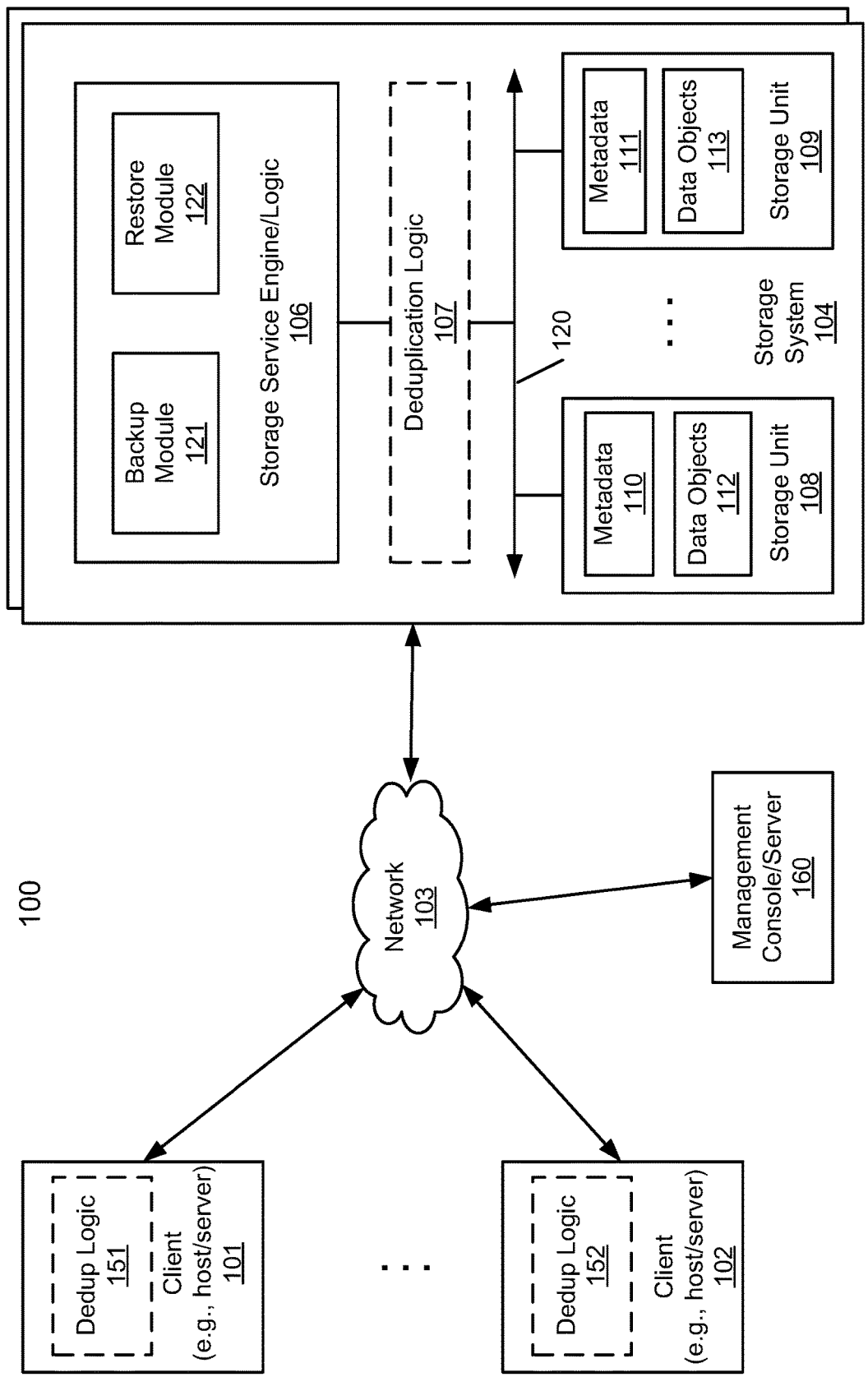
FIG. 1 is a block diagram illustrating a storage system according to one embodiment of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

Embodiments of the disclosure relate to an apparatus, method, and system for indexing backed up files. A File index and a Backup index are maintained, the File index comprising entries each associated with an individual file backed up, the Backup index comprising entries each associated with a particular backup, each backup including one or more files, wherein each File index entry comprises a first property indicative a time of an earliest backup in which a corresponding file is included for a first time and backed up and a second property indicative a time of an earliest backup in which the corresponding file is no longer included, and wherein each Backup index entry comprises a corresponding backup creation time and a corresponding backup expiration time. A request to determine whether or not a first file is included in a first backup is received. Whether or not the first file is included in the first backup is determined based on the File index entry corresponding to the first file and the Backup index entry corresponding to the first backup. Thereafter, a result of the determination of whether or not the first file is included in the first backup is returned.

In one embodiment, the second property is set to NULL until the earliest backup in which the corresponding file is no longer included is encountered.

In one embodiment, the first file is determined to be included in the first backup when the first property of the File index entry associated with the first file indicates a time earlier than or equal to a backup creation time comprised in the Backup index entry associated the first backup, and the second property of the File index entry associated with the first file indicates a time later than the backup creation time comprised in the Backup index entry associated the first backup or is NULL.

In one embodiment, whether a second file is included in any valid backup based on the File index entry corresponding to the second file and the Backup index is determined.

In response to determining that the second file is not included in any valid backup, the second file is deleted at a backup medium.

In one embodiment, the second file is determined to be not included in any valid backup when the second property of the File index entry associated with the second file indicates a time that is earlier than or equal to a backup creation time of a valid backup associated with an oldest backup creation time in the Backup index.

In one embodiment, all files that are not included in any valid backup are determined. All files that are determined not to be included in any valid backup are deleted.

In one embodiment, each File index entry comprises a file name of the corresponding file.

FIG. 1 is a block diagram illustrating a storage system according to one embodiment of the invention. Referring to FIG. 1, system 100 includes, but is not limited to, one or more client systems 101-102 communicatively coupled to storage system 104 over network 103. Clients 101-102 may be any type of clients such as a host or server, a personal computer (e.g., desktops, laptops, and tablets), a "thin" client, a personal digital assistant (PDA), a Web enabled appliance, or a mobile phone (e.g., Smartphone), etc. Alternatively, any of clients 101-102 may be a primary storage system (e.g., local data center) that provides storage to other local clients, which may periodically back up the content stored therein to a backup storage system (e.g., a disaster recovery site or system), such as storage system 104. Network 103 may be any type of networks such as a local area network (LAN), a wide area network (WAN) such as the Internet, a fiber network, a storage network, or a combination thereof, wired or wireless. Clients 101-102 may be in physical proximity or may be physically remote from one another. Storage system 104 may be located in proximity to one, both, or neither of clients 101-102.

Storage system 104 may include or represent any type of servers or a cluster of one or more servers (e.g., cloud servers). For example, storage system 104 may be a storage server used for various different purposes, such as to provide multiple users or client systems with access to shared data and/or to back up (or restore) data (e.g., mission critical data). Storage system 104 may provide storage services to clients or users via a variety of access interfaces and/or protocols such as file-based access protocols and block-based access protocols. The file-based access protocols may include the network file system (NFS) protocol, common Internet file system (CIFS) protocol, and direct access file system protocol, etc. The block-based access protocols may include the small computer system interface (SCSI) protocols, Internet SCSI or iSCSI, and Fibre channel (FC) protocol, etc. Storage system 104 may further provide storage services via an object-based protocol and Hadoop distributed file system (HDFS) protocol.

In one embodiment, storage system 104 includes, but is not limited to, storage service engine 106 (also referred to as service logic, service module, or service unit, which may be implemented in software, hardware, or a combination thereof), optional deduplication logic 107, and one or more storage units or devices 108-109 communicatively coupled to each other. Storage service engine 106 may represent any storage service related components configured or adapted to provide storage services (e.g., storage as a service) to a variety of clients using any of the access protocols set forth above. For example, storage service engine 106 may include backup logic 121 and restore logic 122. Backup logic 121 is configured to receive and back up data from a client (e.g., clients 101-102) and to store the backup data in any one or more of storage units 108-109. Restore logic 122 is configured to retrieve and restore backup data from any one or more of storage units 108-109 back to a client (e.g., clients 101-102).

Storage units 108-109 may be implemented locally (e.g., single node operating environment) or remotely (e.g., multi-node operating environment) via interconnect 120, which may be a bus and/or a network (e.g., a storage network or a network similar to network 103). Storage units 108-109 may include a single storage device such as a hard disk, a tape drive, a semiconductor memory, multiple storage devices such as a redundant array system (e.g., a redundant array of independent disks (RAID)), a system for storage such as a library system or network attached storage system, or any other appropriate storage device or system. Some of storage units 108-109 may be located locally or remotely accessible over a network.

In response to a data file to be stored in storage units 108-109, according to one embodiment, deduplication logic 107 is configured to segment the data file into multiple segments (also referred to as chunks) according to a variety of segmentation policies or rules. Deduplication logic 107 may choose not to store a segment in a storage unit if the segment has been previously stored in the storage unit. In the event that deduplication logic 107 chooses not to store the segment in the storage unit, it stores metadata enabling the reconstruction of the file using the previously stored segment. As a result, segments of data files are stored in a deduplicated manner, either within each of storage units 108-109 or across at least some of storage units 108-109. The metadata, such as metadata 110-111, may be stored in at least some of storage units 108-109, such that files can be accessed independent of another storage unit. Metadata of each storage unit includes enough information to provide access to the files it contains.

In one embodiment, storage system 104 further includes a storage manager or storage controller (not shown) configured to manage storage resources of storage system 104, such as, for example, storage space and processing resources (e.g., processor, memory, network resources). The storage manager or controller may be accessed by an administrator of management console or server 160 remotely via a management or configuration interface (not shown). The administrator can provision and manage storage resources based on a set of policies, rules, and/or service level agreements. The storage resources may be virtualized into a pool of virtual storage resources, where underlying physical storage resources represented by the corresponding virtual storage resources may be implemented locally, remotely (e.g., hosted by another storage system), or both. The virtual storage resources can be provisioned, allocated, and/or defined by an administrator or automatically by the storage manager based on a set of software-defined policies. The virtual storage resources may be represented in one or more virtual machines (e.g., virtual storage systems) managed by one or more virtual machine managers (VMMs). Each of the virtual machines can be provisioned to provide a particular type of storage services (e.g., file-based, block-based, object-based, or RDFS) to a client based on a storage policy or service level agreement associated with that particular client as part of software-defined storage services.

An existing indexing solution uses two indexes: one File index, and one Backup index. The File index stores file metadata. Only metadata associated with unique files are stored in the File index. In other words, the File index does not contain duplicate entries for duplicate files. The Backup index stores backup metadata for backups, such as the backup creation time, the backup expiration time, and identifiers for all files belonging to a particular backup.

With the existing solution, a garbage collection thread monitors file records that do not belong in any valid backups (e.g., backups that have not expired), and delete the corresponding files.

Referring to FIGS. 2A and 2B, diagrams 200A, 200B illustrating an example prior art backup file indexing method are shown. Referring to FIG. 2A, the existing solution utilizes two indexes: one File index 210, and one Backup index 220. Daily backups are scheduled for the folder "C:/test." On Oct. 4, 2017, there are 6 files under this folder that are backed up: "File1.txt" through "File1.txt" with corresponding file identifiers of "1" through "6," respectively. Entries for the 6 files are added to the File index 210, and an entry (with a backup identifier of "1") for the backup of Oct. 4, 2017 is added to the Backup index 220 to associate the backup with the file identifiers of the files that belong in this backup. The Backup index 220 entry also indicates that the backup of Oct. 4, 2017 will expire on Nov. 4, 2017.

On Oct. 5, 2017, by the time the backup is performed, two files, i.e., "File2.txt" and "File3.txt," have been deleted from the folder, and three new files, i.e., "File7.txt" through "File9.txt," have been added to the folder. Accordingly, entries for "File7.txt" through "File9.txt" are added to the File index 210 and the files are associated with identifiers of "7" through "9," respectively. One entry (with a backup identifier of "2") for the backup of Oct. 5, 2017 is added to the Backup index 220 to associate the backup with the file identifiers of the files that belong in this backup. In particular, file identifiers of "7" through "9" are associated with the backup, and file identifiers of the deleted files (i.e., file identifiers of "2" and "3") are not included. The Backup index 220 entry also indicates that the backup of Oct. 5, 2017 will expire on Nov. 5, 2017.

A garbage collection thread searches for file records that do not belong in any valid, unexpired backups, and deletes the corresponding files. Referring to FIG. 2B, on Nov. 4, 2017, the backup of Oct. 4, 2017 expires. The garbage collection thread may then determine that "File2.txt" and "File3.txt" are no longer referenced by any valid backups. Thereafter, the garbage collection thread may delete the files "File2.txt" and "File3.txt" from the backup media.

The existing solution is associated with a few drawbacks. For example, performance can be poor when expired files are deleted during the garbage collection process. In particular, to determine whether a file is or is not referenced by any valid backup, all file identifiers associated with all valid backups need to be traversed, which is time-consuming. One test shows that a garbage collection process that involves one million files can take upwards of 50 minutes. Further, the Backup index may consume a significant amount of storage space. Moreover, cross-referencing search results with particular backups can be slow because the search results need to be reprocessed to find the files that belong in the specified backups.

One embodiment is related to an improved method for indexing backed up files. Two indexes are used: one File index and one Backup index. Changes are made to both indexes compared to the prior art solution described above. Two new properties are added to the entries in the File index: a first property, which can be designated as the "FirstValid" property and indicates the time of the earliest backup in which the corresponding file is included for the first time and backed up, and a second property, which can be designated as the "LastValid" property and indicates the time of the earliest backup in which the corresponding file is no longer included (i.e., the time of the backup immediately subsequent to the backup in which the corresponding file is included for a last time) (in other words, the file has been deleted at the source between the times of these two backups). Before the value of the second property is definitively set for an entry (i.e., before it is determined that the corresponding file is no longer included in the backup), the second property is left empty (i.e., set to NULL). In the Backup index, other than the backup identifier, each entry is also associated with a backup creation time and a backup expiration time. However, the entries in the Backup index are not associated with any file identifiers. In other words, the Backup index is not relied on to associate particular files with particular backups.

Referring to FIGS. 3A and 3B, diagrams 300A, 300B illustrating an example backup file indexing method according to one embodiment are shown. As can be seen in FIG. 3A, the Backup index 320 is compact because its entries do not contain file identifiers. As indicated in the File index 310, based on the "LastValid" property, on Oct. 5, 2017, the files "File2.txt" and "File3.txt" were found to be no longer included in the latest backup made on that date. Based on the "FirstValid" property, the files "File7.txt" through "File9.txt" were first added with the backup created on Oct. 5, 2017. Files whose entries contain a NULL in their "LastValid" properties still exist in the latest backup.

When the "LastValid" property indicates a time that is earlier than or equal to the backup creation time of the valid, unexpired backup associated with the oldest backup creation time, the corresponding file does not belong in any valid backup, and therefore can be deleted through the garbage collection process. Referring to FIG. 3B, the "LastValid" properties for the files "File2.txt" and "File3.txt" have been set to Oct. 5, 2017, which means these two files no longer exist as of the backup created on Oct. 5, 2017. On Nov. 4, 2017, the backup created on Oct. 4, 2017 expires, and the backup creation time of the valid backup associated with the oldest backup creation time is Oct. 5, 2017, which is equal to the time indicated by the "LastValid" properties for the files "File2.txt" and "File3.txt." Accordingly, it can be determined that the files "File2.txt" and "File3.txt" do not belong in any valid backup, and therefore should be deleted. Performance improvement can be observed during the garbage collection process as it takes only a simple query in the File index to determine the files that need to be deleted.

Whether a file belongs in a particular backup may be determined based on the "FirstValid" and "LastValid" properties. For example, if the "FirstValid" property indicates a time earlier than or equal to the backup creation time of a particular backup, and the "LastValid" property indicates a time later than the backup creation time of the particular backup or is NULL, the corresponding file is part of that backup.

FIG. 4 is a block diagram 400 illustrating various components that can be used with embodiments of the disclosure. The indexing engine 410 creates and maintains the File index 310 and the Backup index 320. The query engine 420 queries the two indexes to return results usable in the determination of e.g., whether a particular file belongs in a particular backup, or whether a particular file no longer belongs in any valid backup, etc. Each of the indexing engine 410 and the query engine can be implemented in hardware, software, or a combination thereof.

Figure 5:
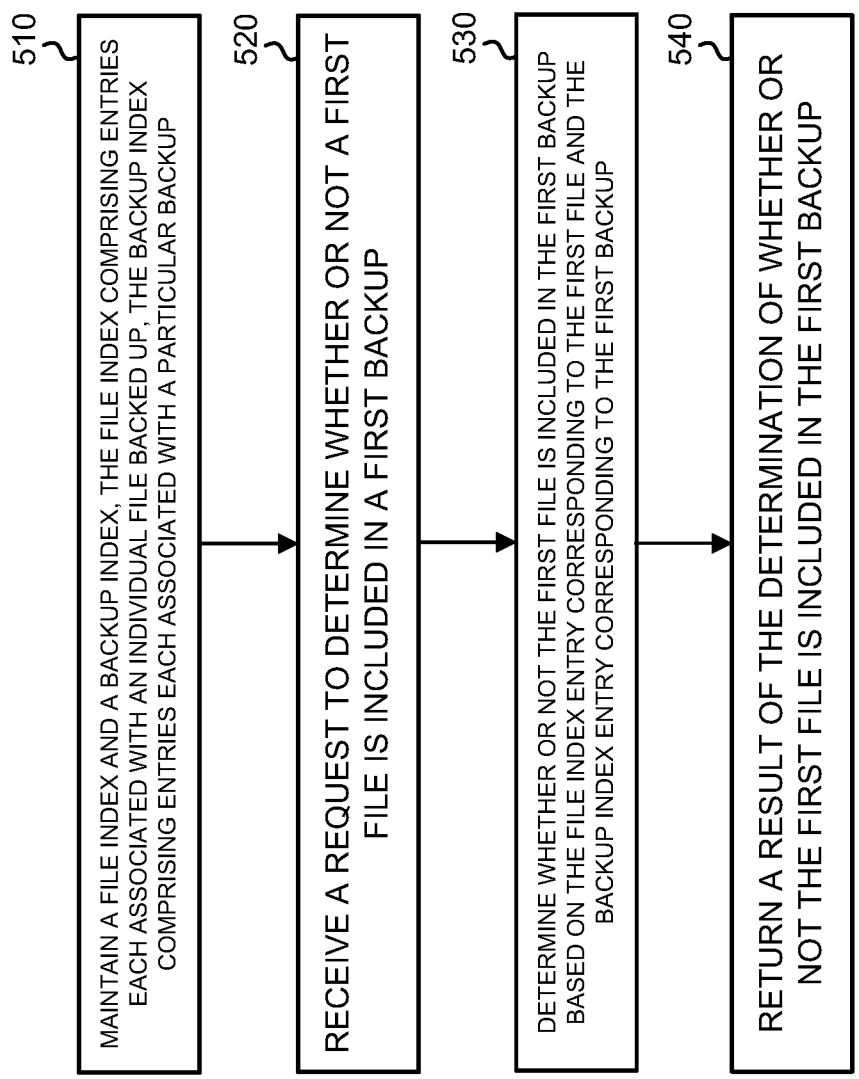
FIG. 5 is a flow diagram illustrating a process of indexing backed up files according to one embodiment of the disclosure.

FIG. 5 is a flow diagram illustrating a process 500 of indexing backed up files according to one embodiment of the disclosure. Process 500 may be performed by processing logic that includes hardware (e.g. circuitry, dedicated logic, etc.), software (e.g., embodied on a non-transitory computer readable medium), or a combination thereof. For example, process 500 may be performed by processors 1501 of FIG. 6. Referring to FIG. 5, at block 510, a File index and a Backup index are maintained, the File index comprising entries each associated with an individual file backed up, the Backup index comprising entries each associated with a particular backup, each backup including one or more files, wherein each File index entry comprises a first property indicative a time of an earliest backup in which a corresponding file is included for a first time and backed up and a second property indicative a time of an earliest backup in which the corresponding file is no longer included, and wherein each Backup index entry comprises a corresponding backup creation time and a corresponding backup expiration time. At block 520, a request to determine whether or not a first file is included in a first backup is received. At block 530, whether or not the first file is included in the first backup is determined based on the File index entry corresponding to the first file and the Backup index entry corresponding to the first backup. At block 540, a result of the determination of whether or not the first file is included in the first backup is returned.

Embodiments of the disclosure relate to a backup file indexing scheme that utilizes the "FirstValid" and "LastValid" properties. As the Backup index does not contain file identifiers, a significant amount of storage space can be saved. Further, improved performance can be observed when cross-referencing search results with backups, as well as during the garbage collection process, as only a simple query is required to determine the relevant files.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 6:
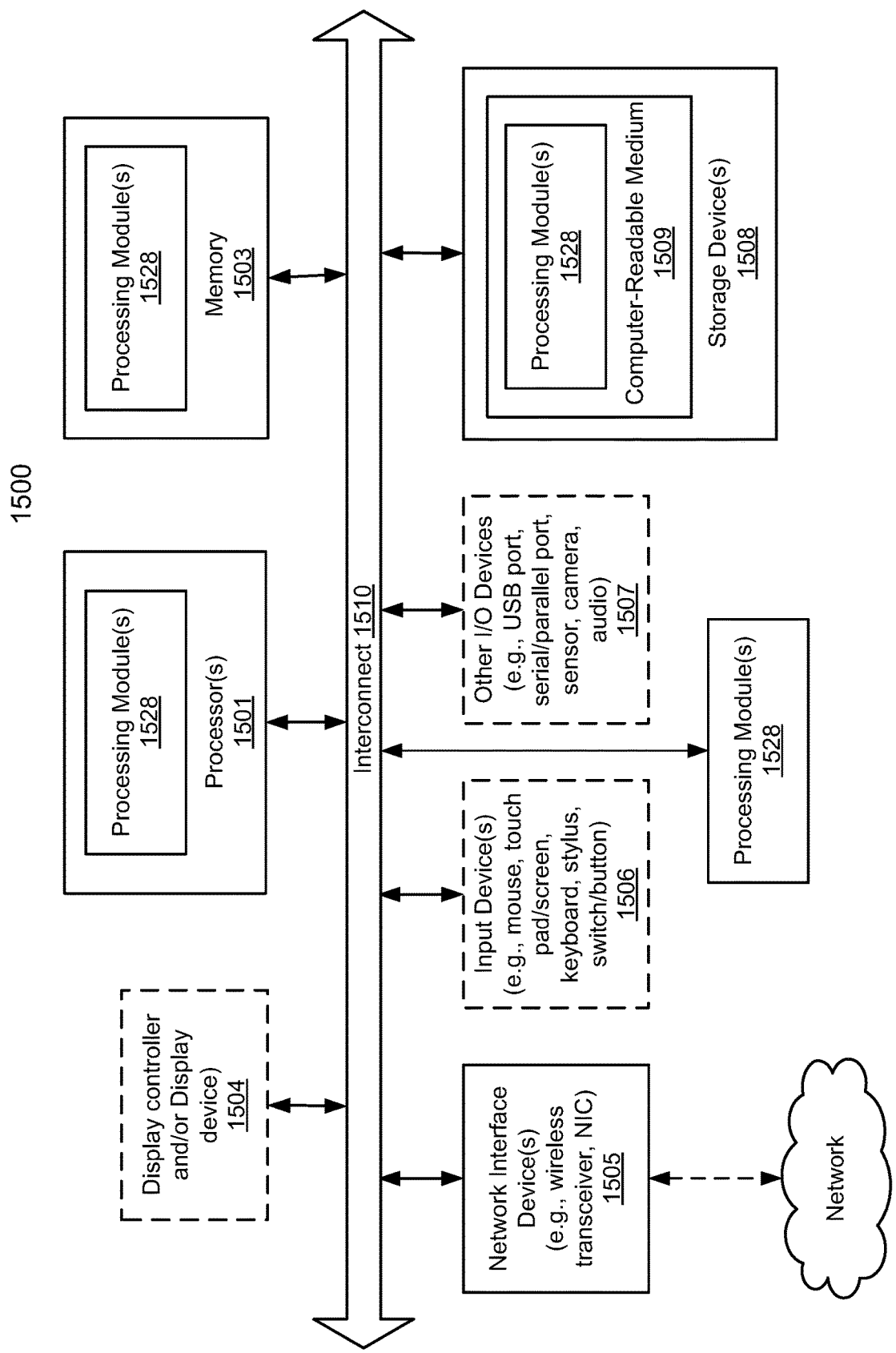
FIG. 6 is a block diagram illustrating a data processing system according to one embodiment.

FIG. 6 is a block diagram illustrating an example of a data processing system which may be used with one embodiment of the invention. For example, system 1500 may represents any of data processing systems described above performing any of the processes or methods described above. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., processing module, unit, and/or logic 1528) embodying any one or more of the methodologies or functions described herein. Processing module/unit/logic 1528 may represent any of the components described above, such as, for example, a storage service logic, a deduplication engine, an indexing engine, a query engine, as described above. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method, comprising:
    maintaining a File index and a Backup index, the File index comprising entries each associated with an individual file backed up, the Backup index comprising entries each associated with a particular backup, each backup including one or more files, wherein each File index entry comprises a first property indicative a time of an earliest backup in which a corresponding file is included for a first time and backed up and a second property indicative a time of an earliest backup in which the corresponding file is no longer included, and wherein each Backup index entry comprises a corresponding backup creation time and a corresponding backup expiration time;
    receiving a request to determine whether or not a first file is included in a first backup;
    determining whether or not the first file is included in the first backup based on the first property and the second property comprised in the File index entry corresponding to the first file and the Backup index entry corresponding to the first backup; and
    returning a result of the determination of whether or not the first file is included in the first backup.

2. The method of claim 1, wherein the second property is set to NULL until the earliest backup in which the corresponding file is no longer included is encountered.

3. The method of claim 2, wherein the first file is determined to be included in the first backup when the first property of the File index entry associated with the first file indicates a time earlier than or equal to a backup creation time comprised in the Backup index entry associated the first backup, and the second property of the File index entry associated with the first file indicates a time later than the backup creation time comprised in the Backup index entry associated the first backup or is NULL.

4. The method of claim 1, further comprising:
    determining whether a second file is included in any valid backup based on the File index entry corresponding to the second file and the Backup index; and
    in response to determining that the second file is not included in any valid backup, deleting the second file at a backup medium.

5. The method of claim 4, wherein the second file is determined to be not included in any valid backup when the second property of the File index entry associated with the second file indicates a time that is earlier than or equal to a backup creation time of a valid backup associated with an oldest backup creation time in the Backup index.

6. The method of claim 4, further comprising:
    determining all files that are not included in any valid backup; and
    deleting all files that are determined not to be included in any valid backup.

7. The method of claim 1, wherein each File index entry comprises a file name of the corresponding file.

8. A non-transitory machine-readable medium having instructions stored therein, which when executed by a processor, cause the processor to perform data indexing operations, the operations comprising:
    maintaining a File index and a Backup index, the File index comprising entries each associated with an individual file backed up, the Backup index comprising entries each associated with a particular backup, each backup including one or more files, wherein each File index entry comprises a first property indicative a time of an earliest backup in which a corresponding file is included for a first time and backed up and a second property indicative a time of an earliest backup in which the corresponding file is no longer included, and wherein each Backup index entry comprises a corresponding backup creation time and a corresponding backup expiration time;
    receiving a request to determine whether or not a first file is included in a first backup;
    determining whether or not the first file is included in the first backup based on the first property and the second property comprised in the File index entry corresponding to the first file and the Backup index entry corresponding to the first backup; and
    returning a result of the determination of whether or not the first file is included in the first backup.

9. The non-transitory machine-readable medium of claim 8, wherein the second property is set to NULL until the earliest backup in which the corresponding file is no longer included is encountered.

10. The non-transitory machine-readable medium of claim 9, wherein the first file is determined to be included in the first backup when the first property of the File index entry associated with the first file indicates a time earlier than or equal to a backup creation time comprised in the Backup index entry associated the first backup, and the second property of the File index entry associated with the first file indicates a time later than the backup creation time comprised in the Backup index entry associated the first backup or is NULL.

11. The non-transitory machine-readable medium of claim 8, the operations further comprising:
    determining whether a second file is included in any valid backup based on the File index entry corresponding to the second file and the Backup index; and in response to determining that the second file is not included in any valid backup, deleting the second file at a backup medium.

12. The non-transitory machine-readable medium of claim 11, wherein the second file is determined to be not included in any valid backup when the second property of the File index entry associated with the second file indicates a time that is earlier than or equal to a backup creation time of a valid backup associated with an oldest backup creation time in the Backup index.

13. The non-transitory machine-readable medium of claim 11, the operations further comprising:
    determining all files that are not included in any valid backup; and
    deleting all files that are determined not to be included in any valid backup.

14. The non-transitory machine-readable medium of claim 8, wherein each File index entry comprises a file name of the corresponding file.

15. A data processing system, comprising:
    a processor; and
    a memory coupled to the processor to store instructions, which when executed by the processor, cause the processor to perform data indexing operations, the operations including:
    maintaining a File index and a Backup index, the File index comprising entries each associated with an individual file backed up, the Backup index comprising entries each associated with a particular backup, each backup including one or more files, wherein each File index entry comprises a first property indicative a time of an earliest backup in which a corresponding file is included for a first time and backed up and a second property indicative a time of an earliest backup in which the corresponding file is no longer included, and wherein each Backup index entry comprises a corresponding backup creation time and a corresponding backup expiration time;
    receiving a request to determine whether or not a first file is included in a first backup;
    determining whether or not the first file is included in the first backup based on the first property and the second property comprised in the File index entry corresponding to the first file and the Backup index entry corresponding to the first backup; and
    returning a result of the determination of whether or not the first file is included in the first backup.

16. The data processing system of claim 15, wherein the second property is set to NULL until the earliest backup in which the corresponding file is no longer included is encountered.

17. The data processing system of claim 16, wherein the first file is determined to be included in the first backup when the first property of the File index entry associated with the first file indicates a time earlier than or equal to a backup creation time comprised in the Backup index entry associated the first backup, and the second property of the File index entry associated with the first file indicates a time later than the backup creation time comprised in the Backup index entry associated the first backup or is NULL.

18. The data processing system of claim 15, the operations further comprising:
    determining whether a second file is included in any valid backup based on the File index entry corresponding to the second file and the Backup index; and
    in response to determining that the second file is not included in any valid backup, deleting the second file at a backup medium.

19. The data processing system of claim 18, wherein the second file is determined to be not included in any valid backup when the second property of the File index entry associated with the second file indicates a time that is earlier than or equal to a backup creation time of a valid backup associated with an oldest backup creation time in the Backup index.

20. The data processing system of claim 18, the operations further comprising:
    determining all files that are not included in any valid backup; and
    deleting all files that are determined not to be included in any valid backup.

21. The data processing system of claim 15, wherein each File index entry comprises a file name of the corresponding file.

* * * * *